US007242821B2

(12) United States Patent
Bull et al.

(10) Patent No.: US 7,242,821 B2
(45) Date of Patent: Jul. 10, 2007

(54) ENHANCED PERFORMANCE MODE CONVERTER

(75) Inventors: Jeffrey D. Bull, Vancouver (CA); Hiroshi Kato, Vancouver (CA); Nicolas August Fleming Jaeger, Vancouver (CA); Pinghe Lu, Vancouver (CA)

(73) Assignee: Versawave Technologies Inc., Burnaby, British Columbia (CA)

( * ) Notice: Subject to any disclaimer, the term of this patent is extended or adjusted under 35 U.S.C. 154(b) by 316 days.

(21) Appl. No.: 10/951,610

(22) Filed: Sep. 29, 2004

(65) Prior Publication Data

US 2006/0067634 A1     Mar. 30, 2006

(51) Int. Cl.
G02B 6/10 (2006.01)
G02B 1/35 (2006.01)

(52) U.S. Cl. ............... 385/2; 385/3; 385/4; 385/8; 385/9; 385/10; 385/11; 385/28; 385/129; 385/130; 385/131; 385/132

(58) Field of Classification Search ............ 385/2, 385/8, 3, 9, 4, 10, 11, 28, 129, 130, 131, 132
See application file for complete search history.

(56) References Cited

U.S. PATENT DOCUMENTS

| | | | | |
|---|---|---|---|---|
| 3,877,782 | A * | 4/1975 | Kaminow | 385/130 |
| 4,032,216 | A * | 6/1977 | Henry | 385/6 |
| 4,236,785 | A * | 12/1980 | Papuchon et al. | 385/122 |
| 4,381,138 | A * | 4/1983 | Buhl | 385/40 |
| 4,381,139 | A * | 4/1983 | Alferness | 385/9 |
| 4,856,094 | A * | 8/1989 | Heidrich et al. | 398/204 |
| 5,150,436 | A * | 9/1992 | Jaeger et al. | 385/2 |
| 5,355,422 | A | 10/1994 | Sullivan et al. | |
| 5,380,410 | A * | 1/1995 | Sawaki et al. | 361/225 |
| 5,566,257 | A * | 10/1996 | Jaeger et al. | 385/2 |
| 5,838,869 | A * | 11/1998 | Rasch et al. | 385/132 |
| 5,991,067 | A * | 11/1999 | Minakata et al. | 359/332 |
| 6,310,700 | B1 | 10/2001 | Betts | |
| 6,545,791 | B1 * | 4/2003 | McCaughan et al. | 359/245 |

OTHER PUBLICATIONS

Vanmaekeibergh et al., "Free Carrier Generation in Semiconductors Induced by Absorption of Subband-Gap Light", *The American Physical Society*, 1998, vol. 80, No. 4, pp. 821-824.
http://www.telephonyworld.com/cgi-bin/reviews/viewnews.cgi?category=all&id=103067, "Bookham Technology to Present Novel Gaas Transmitter At Ecoc 02", *Telephony* World, 2004, pp. 1-2.
http://www.dow.com/cyclotene/, "Benzocyclobutene (BCB)-based polymer dielectncs" 2004, 1 page.
Famoosh Rahmatian, et al., "An Ultrahigh-Speed AlGaAs-GaAs Polarization Converter Using Slow-Wave Coplanar Electrodes", *IEEE Photonics Technology Letters*, vol. 10., No. 5, May 1998, pp. 675-677.

\* cited by examiner

*Primary Examiner*—Frank G. Font
*Assistant Examiner*—James P. Hughes
(74) *Attorney, Agent, or Firm*—Jeffrey M. Measures; Borden Ladner Gervais LLP

(57) ABSTRACT

An optical mode converter comprising a slow wave electrode structure and including Schottky barriers for preventing an accumulation of free carriers in the optical waveguide region of the converter. The Schottky barriers are also used for suppressing higher order modes in the waveguide. Low refractive index insulators are used to allow efficient driving of the device without hindering the impedance or the microwave index of the optical mode converter. Two-photon absorption processes are eliminated through the use of a waveguide semiconductor material having a bandgap of at least twice the photon energy of the light beam propagating through the optical mode converter.

21 Claims, 3 Drawing Sheets

ENHANCED PERFORMANCE MODE CONVERTER

FIELD OF THE INVENTION

The present invention relates generally to optical mode converters. More particularly, the present invention relates to electro-optical mode converters having a slow wave electrode structure.

BACKGROUND OF THE INVENTION

Electro-optical mode converters are used in optical communications systems to allow rapid modulation of an optical signal in accordance with an electrical signal. In most cases, an input light beam having an input state of polarization (SOP) impinges on and traverses through an electro-optical waveguide subjected to an applied electric field. When the geometry of the waveguide and the applied electric field are such that the input SOP is not aligned with a principal axis of the waveguide, the light beam at the output of the waveguide will generally have an output SOP different from the input one. With proper choice of input SOP, waveguide geometry and applied electrical field, it is possible to have the output SOP orthogonal to the input SOP. The expression "mode converter" usually refers to the case where the input and output SOP's are linear and orthogonal to each other whereas the appellation "modulator" is more general term describing a modulation of the light beam's amplitude and/or phase and/or SOP.

Structurally, an electro-optical mode converter will usually include an electro-optic substrate such as a III-V semiconductor or $LiNbO_3$-based material with a defined optical waveguide and an electrode structure disposed in the vicinity of the optical waveguide. As a voltage is applied to the electrodes, an electric field is generated within the optical waveguide and modifies the optical parameters of the waveguide including the orientation of its principal axes and/or its birefringence. This allows for the modulation of the SOP of a light beam traversing the optical waveguide. The term principal axes of a waveguide, or principal waveguide axes, is used to describe the two directions that are parallel to the dominant electric field components of the two lowest order hybrid modes of the waveguide. The orientation of the principal waveguide axes is dependent on the waveguide's geometry and the principal optical axes of the material forming the waveguide.

U.S. Pat. No. 5,566,257, hereinafter referred to as '257, issued Oct. 15, 1996 to Jaeger et al., which is incorporated herein by reference, discloses an electro-optic modulator having an electrode structure with two spaced apart conductive strips disposed on either side of a single semiconductor optical waveguide. Each conductive strip includes projections, or fins, projecting towards the other conductive strip and disposed so as to affect the electro-optical parameters of the waveguide upon a voltage being applied to the conductive strips. At the end of the projections, adjacent the waveguide, are pads.

The electrode structure of '257 is referred to as a "slow wave" electrode structure because it allows a reduction in phase velocity of the microwave signal provided by a voltage signal source connected to the electrode structure and allows for the electromagnetic signal generated at the electrodes to remain substantially in phase with the SOP modulation. The electrode structure of the modulator of '257 can be referred to as a slow wave electrode, and the modulator can be referred to as an electro-optic modulator using slow wave electrodes.

The teachings of '257 provide an electro-optic modulator requiring less electrical and optical power and capable of running at higher frequency than Mach-Zehnder type slow wave modulators such as described in U.S. Pat. No 5,150,436, issued Sep. 22, 1992 to Jaeger et al., which is incorporated herein by reference.

Electro-optic mode modulators such as the ones disclosed in '257 are prone to problems caused by the presence of free carriers, i.e. conduction electrons or holes, in the semiconductor epilayer. These free carriers are present, even though the epilayer is not intentionally doped. The free carriers accumulate under the electrodes when an electric field resulting from a voltage being applied to the electrode structure appears in the modulator. This accumulation of free carriers leads to a screening of the electric field in the waveguide which leads to a less effective modulator. The screening of the electric field is most pronounced at low frequencies, making the modulator difficult to bias to a desired operating point. Furthermore, in cases where a large biasing field is required to overcome modal birefringence between the TE and TM-like modes, the field screening problem is compounded. As free carriers build up, they diminish the effect of the electric field on the waveguide. This is typically compensated for by adjusting the DC bias voltage to increase the strength of the field to offset the free carrier related reduction in field strength.

It would thus be desirable to have a mechanism that would alleviate the problem caused by the presence of free carriers.

Another problem with electro-optic modulators such as described in '257 is that related to the presence of higher order optical modes in the waveguide. The presence of these higher modes lead to unpredictable behaviour depending on the amount of power coupled into the higher order modes. Higher order modes can result in degraded extinction ratio and transfer function instability.

Furthermore, in the device described in '257, the voltage required for mode conversion depends, amongst other factors, on the distance separating pads disposed on either side of the waveguide. The smaller the pad separation, the lower the mode conversion voltage will be and, consequently, so will the power requirement of the mode converter. However, decreasing the pad separation tends to increase the capacitance of the device thereby lowering the impedance of the electrode structure, which should be maintained at a fixed value, such as 50Ω, for optimum performance. Moreover, the mode conversion voltage may by lowered by designing the geometry of the electrode structure to include a high ratio of pad length to pad pitch. However, as in the case where the distance separating the pads is decreased, a higher ratio of pad length to pad pitch leads to an increase in capacitance and a decrease in impedance.

In addition to being concerned about having an electrode structure that attains an optimum impedance, one must also consider how changes in the electrode structure design affect the microwave index of the electro-optic mode converter. The microwave index, which should be similar to the index of the optical mode of the waveguide, increases with increasing capacitance.

The generation of free carriers in semiconductors through absorption of sub-bandgap light is well known and has been documented. A document where this subject matter is addressed is by Vanmaekelbergh et al. in Phys. Rev. Lett. Volume 80, Number 4, Pp. 821-824 (1998). As mentioned above, the presence of free carriers in electro-optic modulators such as disclosed in '257 leads to poor device performance. The most important effect leading to the generation of free carriers by absorption of subband-gap light in unintentionally doped semiconductors is that of two photon absorption, which occurs when a light beam having an energy of at least half the bandgap energy of the semiconductor material impinges on the material and/or propagates therethrough. The number of free carriers generated by the two photon absorption process depends on the optical intensity becomes more problematic as the intensity of the light beam is increased.

It would thus be desirable to have means for alleviating the problem caused by the presence of intrinsic free carriers as well as for eliminating or attenuating higher order optical modes. It would also be desirable to have a mechanism that would allow for a lower mode conversion voltage without leading to a higher than desired capacitance and hence a higher microwave index than the optical index. Finally, it would be desirable to have a waveguide including a material having a bandgap larger than twice the photon energy of the light beam propagating through the waveguide.

SUMMARY OF THE INVENTION

It is an object of the present invention to obviate or mitigate at least one disadvantage of previous mode converter modulators.

In a first aspect of the present invention, there is provided an optical mode converter for receiving an input light beam having an initial state of polarization (SOP) and for converting the initial SOP to a desired SOP. The optical mode converter comprises an optical guiding layer and an electrode structure. The optical guiding layer has an optical waveguide formed from an electro-optic material. The optical guiding layer and waveguide both have a layer with free carriers. The electrode structure has two electrodes. The electrodes are disposed on opposing sides of the optical waveguide and each has a conductor strip with projections that extend towards the optical waveguide. The electrode structure produces an electric field across the waveguide upon application of a voltage signal, and additionally produces both an inductance and a capacitance. Each electrode has a metal portion in contact with the layer having free carriers to form a Schottky barrier adjacent the waveguide to reduce accumulation of free carriers.

In embodiments of the present invention, the optical waveguide supports both a low order optical mode and a higher order optical mode, the higher order optical mode attenuated by the Schottky barrier and the inductance and capacitance produced by the electrodes and projections slows the propagation of the voltage signal through the electrode structure to substantially the velocity of the input light beam through the optical waveguide.

In another embodiment, an anisotropy of the electro-optic material is modified in accordance with the electric field, which can change the birefringence of the optical waveguide. In a further embodiment, the light beam has a photon energy associated with it and the waveguide is formed of a semiconductor material having a bandgap of at least approximately twice the photon energy of the light beam.

In a further embodiment, the mode converter includes an insulator layer disposed between at least a portion of the optical guiding layer and each electrode. The insulator layer is formed of one or more of silicon nitride and a material selected from a list including benzocyclobutene-based polymer layers, polymethyl methacrylate-based polymer layers and polyamide-based layers. In some presently preferred embodiments, the insulator layer applies asymmetric stresses to the waveguide.

In a further embodiment of the present invention, the optical guiding layer is supported by a substrate such as a gallium-arsenide substrate. In other embodiments, the optical guiding layer includes a compound semiconductor optical layer such as an aluminium gallium arsenide epilayer, which is the layer having free carriers. In other embodiments, the compound semiconductor optical layer includes an aluminium gallium arsenide epilayer, the epilayer being the layer having free carriers, and wherein the optical guiding layer is supported by a gallium-arsenide based substrate. In some alternate embodiments, the compound semiconductor optical layer includes an indium gallium arsenide phosphide based epilayer, the epilayer being the layer having free carriers, and wherein the optical guiding layer is supported by an indium phosphide based substrate.

In a further embodiment, the optical mode converter includes at least one slab mode absorber disposed on the optical guiding layer in proximity to the waveguide to absorb undesired slab modes of the input light. In other embodiments the electro-optic material has defined principal optical axes, and the optical waveguide has principal waveguide axes that are substantially aligned with the principal optical axes of the electro-optic material.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

The present invention sets out to provide an enhanced electro-optical mode converter by alleviating problems due to the presence of free carriers (both intrinsic free carriers and free carriers generated through multi-photon absorption) in the waveguide region of the modulator. The invention further sets out to mitigate the effect of the presence of higher order modes in the waveguide as well as to provide a means for allowing a lower mode conversion voltage without substantially augmenting the modulator's inductance and capacitance.

Figure 1B:
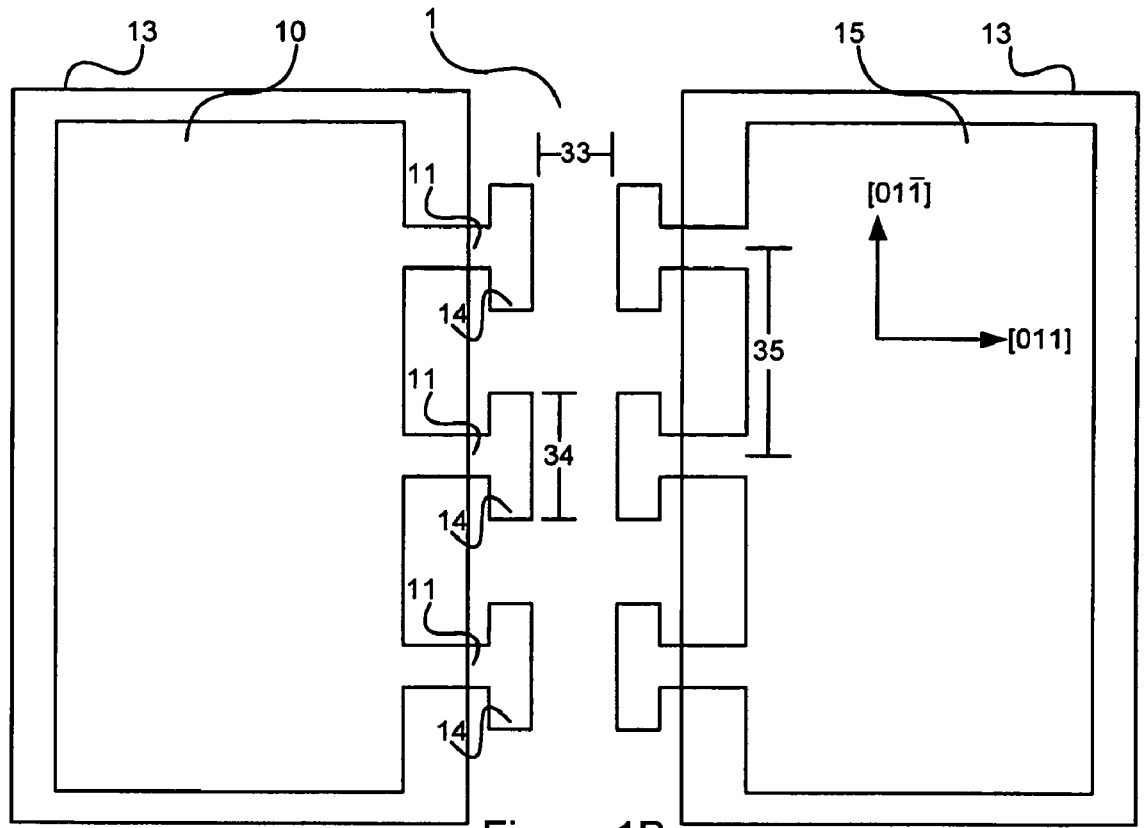
FIG. 1b is a top view of the electro-optical modulator of the present invention.
Figure 1A:
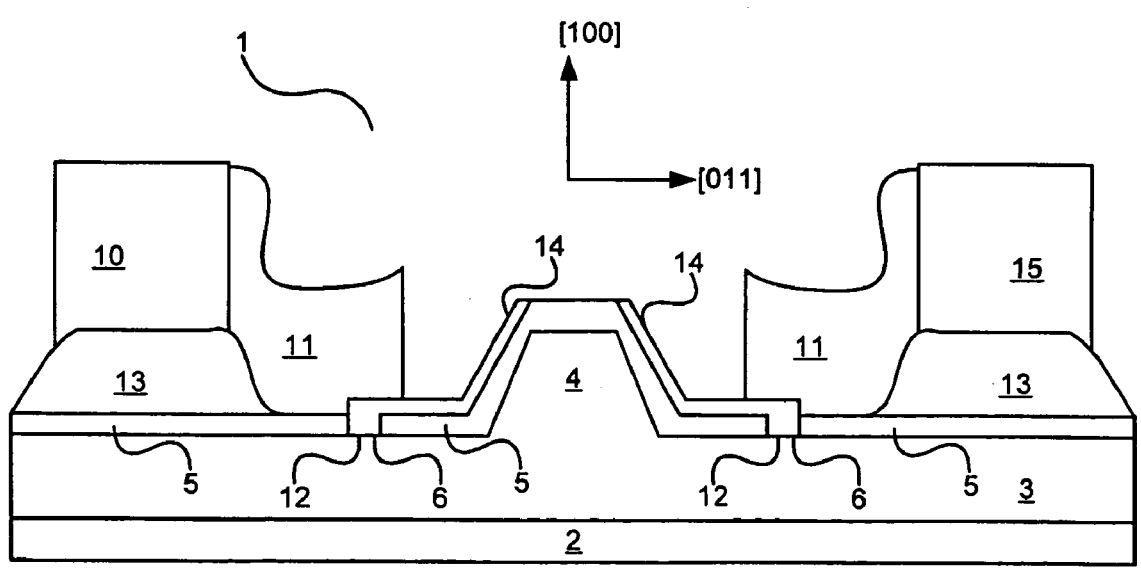
FIG. 1a is a cross-sectional view of the electro-optical modulator of the present invention.
Figure 2:
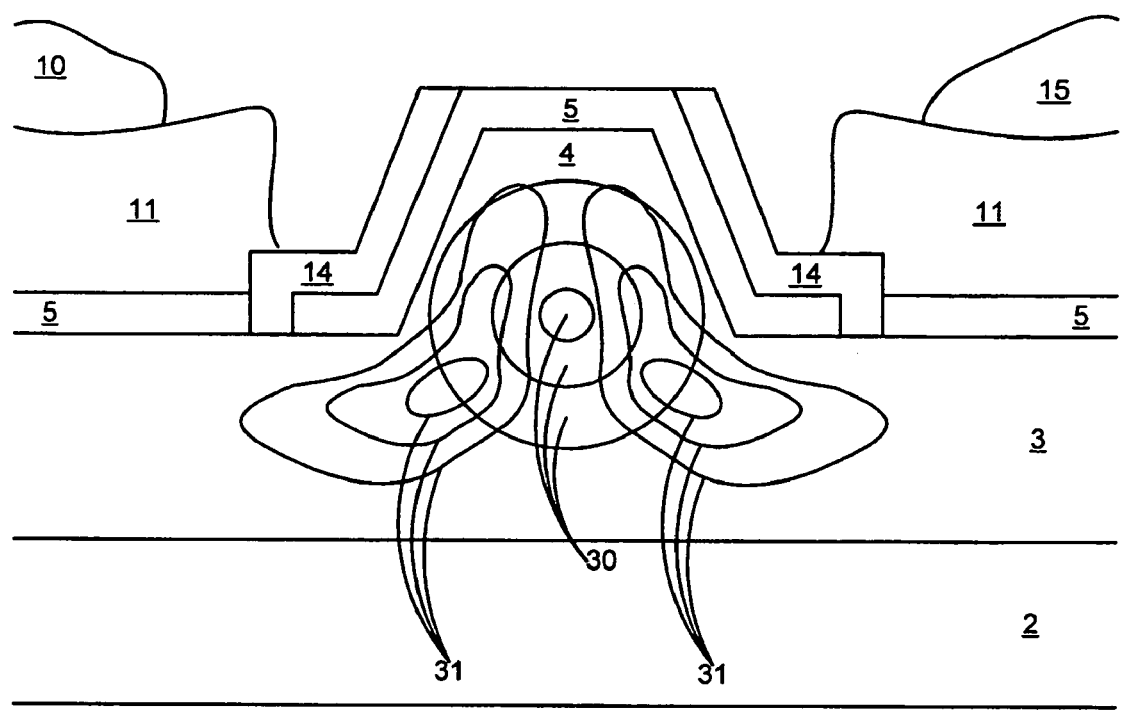
FIG. 2 is a cross-sectional view of the waveguide populated by the lowest order mode and a higher order mode.

An embodiment of the present invention is shown in FIGS. 1A and 1B where cross-sectional and top views of optical mode converter 1 are respectively shown.

A substrate 2 supports an optical guiding layer, such as layer 3, which includes a waveguide, such as ridge optical waveguide 4. In a presently preferred embodiment, the optical guiding layer, illustrated as layer 3, is epitaxially grown on substrate 2, though in other embodiments, layer 3 is simply bonded to substrate 2, or attached using other known techniques. Layer 3 is preferably nominally undoped.

Layer 3 is typically made up of several layers to establish optical guiding in the vertical direction. For example, layer 3 can be a graded index layer, composed of multiple layers with uniform indices, or a combination of graded and uniform index layers. Methods by which the formation of waveguide 4 in conjunction with layer 3 is achieved are known in the art. Waveguide 4 is shown as disposed on (100) or equivalent substrate with the longitudinal axis 20 of waveguide 4 preferably aligned to the [011] or equivalent crystallographic direction.

Semi-insulating substrate 2 may be based on a binary III-V semiconductor materials such as, for example, GaAs or InP while layer 3 may be based on ternary or quaternary III-V semiconductor materials such as, for example, $In_xGa_{1-x}P$, $Al_xGa_{1-x}As$ or $In_{1-x}Ga_xAs_yP_{1-y}$, where $0 \leq x \leq 1$. The choice of these materials, combined with the geometry of optical waveguide 4 give rise to enhanced electro-optical properties of optical waveguide 4. Thus, a variation in an electric field applied across optical waveguide 4 gives rise to a variation in the optical anisotropy of optical waveguide 4. That is, the birefringence and the principal axes of optical waveguide 4 will vary with the electric field thus enabling optical mode converter 1. The changes in the birefringence and the orientation of the principal axes are caused by the electro-optic effect, which is known to those skilled in the art.

On top of layer 3 and ridge optical waveguide 4 is shown insulating layer 5, which may include materials such as, for example, silicon nitride ($Si_3N_4$), $SiO_2$, SiO, MgO, and a variety of polymer structures. Though illustrated here as a single layer, insulating layer 5 can be implemented as multiple layers, each layer contacting one half of optical waveguide 4 and applying a force to the waveguide. In embodiments having two layers, each of the layers can apply a different stress to the waveguide, in which case the layers can be referred to as asymmetrical stress layers. The application of asymmetric stress on layer 3 and optical waveguide 4 induces the strain-optic effect. Along with other aspects of the present invention, including the selection of the geometry of the optical waveguide, this assists in passively aligning the principal axes of the waveguide with the principal optical axes of the electro-optic material. One skilled in the art will appreciate that the geometry of the optical waveguide ridge can include both conventional ridge waveguides and asymmetric ridge waveguides (including ridges having one vertical wall and one sloping wall).

An electrode structure, or slow wave electrode structure, including electrodes 10 and 15 having projections 11, is disposed above insulating layer 5, with electrodes 10 and 15 on either side of the ridge of optical waveguide 4. Openings 6 are made through insulating layer 5 on both sides of the ridge of waveguide 4 in order to allow for a portion of projections 11 to contact layer 3. Since projections 11 being metallic in composition, Schottky barriers are formed in area 12 where projections 11 and layer 3 are in contact. Standard Schottky metalizations for GaAs such as Ti/Pt/Au are presently preferred, and the Schottky metalization can be a stack of all three metals with Ti on the bottom in contact with layer 3.

Schottky contacts 12 are placed in proximity to optical waveguide 4 to allow for removal of free carriers from the area of waveguide 4. Without removal of free carriers, the electric field effect will cause the free carriers to accumulate in the ridge optical waveguide area 4 thereby reducing the effective electric field in this region and consequently diminishing the electro-optic efficiency. The decrease in the electro-optic efficiency is most pronounced for static electric fields and is compensated for by an increase of the time averaged mode conversion voltage, also referred to as the DC bias voltage.

The geometry of electrodes 10 and 15, including possible shapes for pads 14, may be found, for example, in '257. Some of the factors considered in determining the geometry include the width and length of projections 11 and pads 14, the gap between fins, the separation between pads and the thickness of projections 11 and pads 14.

Figure 3:
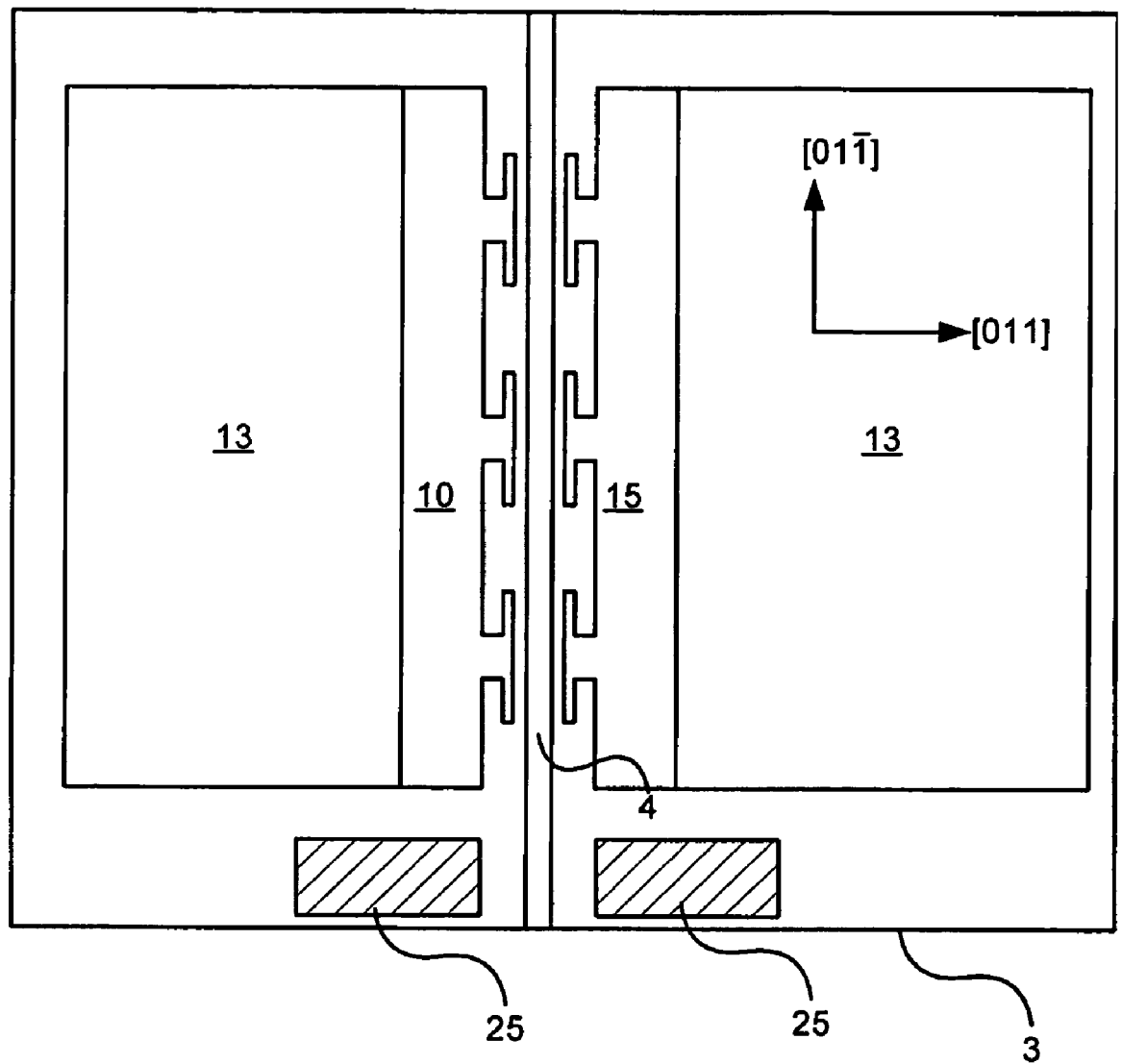

In addition to preventing the accumulation of free carriers in the vicinity of the ridge of optical waveguide 4, the Schottky barriers of area 12 have the added benefit of suppressing high order optical modes that might propagate through the ridge of optical waveguide 4. Higher order modes lead to reduced extinction ratio and are generally deleterious to communications systems. FIG. 3 depicts the optical intensity contours of the first order mode 30 (TE-like) and a higher order mode 31, First order mode 30 is confined to the ridge of optical waveguide 4 while higher order mode 31 has significant overlap with the area 12, i.e., with the Schottky barriers. Thus, lowest order mode 30, will not be attenuated through absorption of mode 30 at the Schottky barriers but higher order mode 31 will be. The absorption of higher order modes is caused by carriers in the metal of the Schottky barrier. Similarly, the Schottky barriers of area 12 prevent layer 3 from acting as a planar waveguide by absorbing energy from slab (or planar) modes.

As a further refinement, Schottky contacts can be supplemented by slab mode absorbers 25 as shown in FIG. 3. The slab mode absorbers 25 are preferably disposed at ends of the modulator device, to absorb and dissipate the energy of any extraneous modes that arise in the operation of the device.

The slow wave electrode structure shown in FIGS. 1A and 1B is required to have a fixed impedance, usually 50Ω, and a microwave phase velocity closely matched to the group velocity of the optical mode propagating through optical waveguide 4. In order to minimize the drive voltage of optical mode converter 1, it is preferable to have a short separation S 33 between pads 14 facing each other from across optical ridge waveguide 4. Pads 14 should also be without air gaps at the pad-optical ridge waveguide interface in order to maximize electric field strength in optical waveguide 4. Additionally, the ratio R of pad length L 34 to pad pitch P 35 should be maximum However, there is a trade-off between minimizing the drive voltage and maintaining the optimal impedance of modulator 1. Maximizing ratio R and decreasing separation S leads to an increase in capacitance which yields a lower impedance optical mode converter 1. The higher capacitance also tends to increase the microwave index which leads to a velocity mismatch between the microwave signal produced at electrodes 10 and 15 and the envelope of the optical signal propagating through optical waveguide 4.

A mechanism for allowing a decrease in separation S 33 and an increase in ratio R without changing the capacitance or inductance is introduced by the addition of low dielectric constant insulator material 13 under electrodes 10 and 15 as shown in FIG. 1A. Candidates for insulator material 13 include, amongst others, benzocyclobutene-based polymers (commonly referred to as BCB's), polymethyl methacrylate-based polymers and polyamide-based products.

As mentioned earlier, an electric field screening effect appears when free carriers are present in layer 3. A mechanism for suppressing free carrier generation resulting from two-photon absorption (including trap mediated two-photon absorption) is provided by designing layer 3 to have a semiconductor material with a bandgap more than twice as large as the photon energy of the light beam propagating through it. As an example, a light beam having a wavelength of 1550 nm has a photon energy of 0.8 eV and propagates through $Al_xGa_{1-x}As$ at a temperature of 300° K. In order to have the bandgap of $Al_xGa_{1-x}As$ at least twice as large the photon energy of the light beam, i.e. at least equal to 1.6 eV, the molar fraction x would need to be at least 0.14. Here, the equation below was used to determine the molar fraction x required to have the bandgap twice as large at the light beam photon energy.

$$E_g(Al_xGa_{1-x}As, T=300K) = 1.424 + 1.266x + 0.26x^2 \text{ (eV)}.$$

Layer 3 preferably has a composition such that the majority of the optical power of the first order mode 30 is propagated through material having a bandgap at least twice that of the photon energy. One skilled in the art will appreciate that layer 3 can be composed of more than one material, as is described above.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. An optical mode converter for receiving an input light beam having an initial state of polarization (SOP) and for converting the initial SOP to a desired SOP, the optical mode converter comprising:
   an optical guiding layer having an optical waveguide formed from an electro-optic material, the optical guiding layer and waveguide having a layer with free carriers; and
   an electrode structure having two electrodes, each of the electrodes disposed on opposing sides of the optical waveguide and having a conductor strip with projections extending towards the optical waveguide, the electrode structure for producing an electric field across the waveguide upon application of a voltage signal, and for producing both an inductance and a capacitance, each electrode having a metal portion in contact with the layer having free carriers to form a Schottky barrier adjacent the waveguide to reduce accumulation of free carriers in the waveguide.

2. The optical mode converter of claim 1, wherein the optical waveguide supports both a low order optical mode and a higher order optical mode, the higher order optical mode attenuated by the Schottky barrier.

3. The optical mode converter of claim 1, wherein the inductance and capacitance produced by the electrodes and projections slows the propagation of the voltage signal through the electrode structure to substantially the velocity of the input light beam through the optical waveguide.

4. The optical mode converter of claim 1, wherein an anisotropy of the electro-optic material is modified in accordance with the electric field.

5. The optical mode converter of claim 4, wherein the modification to the anisotropy of the electro-optic material changes the birefringence of the optical waveguide.

6. The optical mode converter of claim 1, wherein the light beam has a photon energy associated with it and the waveguide is formed of a semiconductor material having a bandgap of at least approximately twice the photon energy of the light beam.

7. The optical mode converter of claim 1, further including an insulator layer disposed between at least a portion of the optical guiding layer and each electrode.

8. The optical mode converter of claim 7, wherein the insulator layer is formed of silicon nitride.

9. The optical mode converter of claim 8, wherein the silicon nitride forms two layers, each layer applying a stress to the waveguide.

10. The optical mode converter of claim 7, wherein the insulator layer applies asymmetric stresses to the waveguide.

11. The optical mode converter of claim 7, wherein the insulator layer includes material selected from a list including benzocyclobutene-based polymer layers, polymethyl methacrylate-based polymer layers and polyamide-based layers.

12. The optical mode converter of claim 11, wherein the insulator layer includes both silicon nitride and a material selected from the list.

13. The optical mode converter of claim 1, wherein the optical guiding layer is supported by a substrate.

14. The optical mode converter of claim 13, wherein the substrate is a gallium-arsenide substrate.

15. The optical mode converter of claim 1, wherein the optical guiding layer includes a compound semiconductor optical layer.

16. The optical mode converter of claim 15, wherein the compound semiconductor optical layer includes an aluminium gallium arsenide epilayer.

17. The optical mode converter of claim 16, wherein the aluminium gallium arsenide epilayer is the layer having free carriers.

18. The optical mode converter of claim 15, wherein the compound semiconductor optical layer includes an aluminium gallium arsenide epilayer, the epilayer being the layer having free carriers, and wherein the optical guiding layer is supported by a gallium arsenide based substrate.

19. The optical mode converter of claim 15, wherein the compound semiconductor optical layer includes an indium gallium arsenide phosphide based epilayer, the epilayer being the layer having free carriers, and wherein the optical guiding layer is supported by an indium phosphide based substrate.

20. The optical mode converter of claim 1, further including at least one slab mode absorber disposed on the optical guiding layer in proximity to the waveguide to absorb undesired slab modes of the input light.

21. The optical mode converter of claim 1, wherein electro-optic material has defined principal optical axes, and the optical waveguide has principal waveguide axes that are substantially aligned with the principal optical axes of the electro-optic material.

* * * * *